United States Patent [19]
Tokumoto

[11] 3,891,537
[45] June 24, 1975

[54] ELECTROSTATIC SEPARATING APPARATUS

[76] Inventor: Toshiyuki Tokumoto, 1994-3 Icchome, Nakatomigaka, Nara, Japan

[22] Filed: Oct. 30, 1973

[21] Appl. No.: 411,156

[30] Foreign Application Priority Data
Nov. 1, 1972 Japan.............................. 47-109971
Nov. 9, 1972 Japan.............................. 47-112339
Nov. 15, 1972 Japan.............................. 47-115081

[52] U.S. Cl................. 204/308; 204/185; 204/186; 204/189; 204/302; 204/306; 210/540
[51] Int. Cl............................ B03c 5/02; B03c 5/00
[58] Field of Search.......................... 204/184–191, 204/302–308; 210/546

[56] References Cited
UNITED STATES PATENTS

| | | | |
|---|---|---|---|
| 1,557,340 | 10/1925 | Sandmann | 210/540 X |
| 1,647,344 | 11/1927 | Cushman | 210/540 |
| 1,978,794 | 10/1934 | Van Loenen | 204/302 |
| 2,516,733 | 7/1950 | Unschuld | 204/186 |
| 3,074,870 | 1/1963 | Carswell et al. | 204/188 |
| 3,412,003 | 11/1968 | Tokumoto | 204/186 |
| 3,580,836 | 5/1971 | King | 204/308 |
| 3,719,584 | 3/1973 | Turner | 204/308 |

*Primary Examiner*—Howard S. Williams
*Assistant Examiner*—Aaron Weisstuch
*Attorney, Agent, or Firm*—Morgan, Finnegan, Durham & Pine

[57] ABSTRACT

A liquid separator tank for oil-containing waste liquids accommodates a solvent capable of dissolving oil and having a specific gravity greater than water. It also includes a pair of electrodes disposed within the solvent layer. The oil containing waste liquid is introduced into the tank from its bottom. The separation of the waste liquid into oil, water and other foreign bodies as well as the dissolving of the separated oil into the solvent are carried out primarily within an electrostatic field between the electrodes. In accordance with their specific gravities, the dissociated foreign bodies and water respectively form substantially discrete layers above the solvent layer in this order. At least one side wall of the separator tank is of a double-wall structure and a pocket is defined between the inner and outer walls. The upper edge of the inner side wall extends above the level of the solvent layer, while the upper edge of the outer side wall extends above the upper edge of the inner side wall. Foreign bodies in the layer above the solvent layer flow over the upper edge of the inner side wall into the pocket, while the clarified water above the layer of foreign bodies flows over the upper edge of the outer side wall. The solvent having the dissociated oil dissolved therein is discharged through at least one outlet formed in the surrounding wall of the tank at a position corresponding to the uppermost part of the solvent layer. A drain conduit assembly of a unique construction is provided in flow communication with the solvent outlet in order to keep the level of the solvent layer within a predetermined narrow range regardless of the change in the inflow of the waste liquid into the tank as well as the change in the specific gravity of the oil dissolved solvent in the uppermost part of the solvent layer due to an increased ratio of the dissolved oil in the solvent. The provision of the drain conduit assembly together with the overflow edges of the side walls assures a separate and non-interfering discharging of the dissociated oil, water and other foreign bodies. A cooling pipe is spirally arranged along the lower half of the interior surface of the tank in order to aid in the rising movement of the oil dissolved solvent towards the uppermost part of the solvent layer.

4 Claims, 5 Drawing Figures

ELECTROSTATIC SEPARATING APPARATUS

BACKGROUND OF THE INVENTION

The present invention relates to improvements in a liquid separating apparatus. In particular, this invention relates to improvements in a liquid separator tank utilizing an electrostatic field produced within an electrically insulating solvent.

Prior to this application, I have invented an apparatus for separating sewage or oil containing waste liquid which utilizes an electrostatic field induced in the layer of an electrically insulating and oil dissolving solvent (see Japanese Pat. Application No. 15,549 of 1965). This prior liquid separator includes a tank for containing an electrically insulating solvent having a higher specific gravity than water and capable of dissolving the oil component in the waste liquid. Within the separator tank are disposed a pair of electrodes in the solvent layer and a high D.C. voltage is applied therebetween. The waste liquid is introduced into the tank from its bottom in the form of a multiplicity of droplets and is separated into oil, water and other foreign bodies under the effect of the electrophoretic migration of the droplet within an electrostatic field between the electrodes. The dissociated oil is dissolved in the solvent layer, while the foreign bodies and separated water rise towards the upper surface of the solvent layer to form respectively substantially discrete layers. In accordance with their relative specific gravities, foreign bodies form a layer directly above the solvent layer and the separated water forms a layer above the layer of foreign bodies. In the surrounding wall of the separator tank, a first outlet for discharging the oil dissolved solvent is provided at a position corresponding to the uppermost part of the solvent layer, a second outlet for discharging foreign bodies at a position above the level of the solvent layer and a third outlet for discharging the clarified water at a position above the second outlet.

In the prior separator tank, simple discharge pipes are directly connected to the outlets. However, this arrangement of the outlets and their associated discharge pipes has the following disadvantages. For example, as the clarified water and foreign bodies or substances move towards their outlets, flow disturbances such as whirls are caused in their respective layer. In separating waste liquids, in particular industrial waste liquids released from various factories, chemical substances harmful to human bodies such as polyvinyl alcohol, chrome and the like are dissociated from water and oil as foreign bodies to form a layer on the solvent layer in the tank. The dissociated chemical substances may be of water-soluble nature and, although they do not substantially dissolve into the upper clarified water layer in a quiet state, they tend to be dissolved therein as the interfering disturbances take place between the water layer and the layer of foreign bodies. Thus, there is a good possibility of the detrimental substances being discharged together with the water into the sewerage, which may cause environmental pollution and may not be desirable from the viewpoint of human health. Further, as foreign bodies are increased in their viscosity, the rate of foreign bodies being removed through the discharge pipe is conversely reduced resulting in an increase of the amount of foreign bodies accumulated in a layer in the tank. The increase in the amount of foreign bodies in turn may cause a rise in the level of the layer thereof to a point where the discharge outlet for the clarified water is formed. This is also undesirable since foreign bodies including detrimental chemical substances flow out through the outlet together with the clarified water. Accordingly, it is highly desirable to provide a new and improved drain means which effectively avoids the above pointed disadvantages.

Also in the prior separator tank, a pair of electrodes for producing an electrostatic field within the solvent layer have been made generally in a conical shape. Though the conically shaped electrodes are satisfactory in their operation, they are rather difficult to manufacture especially in light of the fact that a multiplicity of small electrode tips are to be "planted" throughout the curved surfaces of the conical electrodes. This leads to an increased production cost of the entire separating system. Thus, it is desired to provide new and improved electrodes of relatively simple construction which are easy to manufacture and satisfactory in their field producing operation.

SUMMARY OF THE INVENTION

Accordingly, it is a general object of this invention to provide a new and improved electrostatic separating apparatus which is free of the above mentioned disadvantages.

It is an object of this invention to provide an improved electrostatic separating apparatus wherein an oil containing waste liquid is dissociated into oil, water and other foreign bodies under the effect of electrophoresis within an electrostatic field.

It is another object of this invention to provide an improved electrostatic separating apparatus wherein the dissociated oil is dissolved in a solvent within a separator tank and the foreign bodies and water respectively form substantially discrete layers above the solvent layer.

It is another object of this invention to provide an improved electrostatic separating apparatus wherein means is included for discharging the separated water and foreign bodies discriminately without causing any interfering disturbances between the water layer and the layer of foreign bodies.

It is another object of this invention to provide an improved electrostatic separating apparatus wherein the oil dissolved solvent is positively collected in the uppermost part of the solvent layer and is continuously removed from the tank through an outlet.

It is another object of this invention to provide an improved electrostatic separating apparatus wherein the level of the solvent layer is kept within a predetermined narrow range regardless of the change in the solvent layer in the upper part thereof with respect to the layers of foreign bodies and clarified water above the solvent layer.

It is another object of this invention to provide an improved separating apparatus wherein at least one side wall of the tank is of a double-wall design comprising outer and inner side walls and foreign bodies flow over the upper edge of the inner side wall into a pocket between the inner and outer side wall while the clarified water flows over the upper edge of the outer side wall to the exterior of the tank.

It is another object of this invention to provide an improved electrostatic separating apparatus wherein means is provided to cool the solvent layer in the tank down to a temperature relatively lower than that of the waste liquid introduced into the tank from its bottom thereby positively aiding in an upward movement of the oil dissolved solvent towards the upper surface of the solvent layer.

It is another object of this invention to provide an improved electrostatic separating apparatus wherein the waste liquid introduced into the tank shuttles back and forth in the form of droplets within an electrostatic field between a pair of electrodes so as to be separated into progressively smaller particles until the oil and foreign bodies are dissociated from the water.

It is another object to provide improved electrodes for use in the electrostatic separating apparatus which is relatively simple in construction and easy to manufacture.

Briefly stated, an electrostatic separating apparatus embodying one preferred form of this invention includes a separator tank which accommodates a solvent capable of dissolving oil and having a specific gravity greater than water. A pair of electrodes are disposed in a spaced, parallel relation to each other in the solvent layer within the tank and a high D.C. voltage is applied between the electrodes to produce an electrostatic field therebetween. An oil containing waste liquid is introduced into the tank from its bottom in the form of a multiplicity of liquid droplets and guided within the solvent layer into the interelectrode space where they are caused to shuttle at high speed back and forth between the electrodes under the effect of electrophoresis so as to be separated into progressively smaller particles until the oil an other foreign bodies are dissociated from the water. The dissociated oil is substantially dissolved into the solvent as it is being dissociated from the water during the electrophoretic migration. Due to the difference in the specific gravity between the solvent and the dissolved oil, the oil containing solvent moves towards the upper surface of the solvent layer. For the same reason, the foreign bodies and separated water likewise rise towards the upper surface of the solvent layer and respectively form substantially discrete layers above the solvent layer. In accordance to their specific gravities, foreign bodies form a layer directly above the solvent layer and the clarified water forms a layer directly above the layer of foreign bodies.

At least one side wall of the tank is designed to have a doublewall structure which comprises outer and inner side walls. The upper edge of the inner side wall is made to extend above a predetermined intended level of the solvent layer, while the upper edge of the outer side wall extends above the upper edge of the inner side wall. With this double side wall structure, foreign bodies in the layer above the solvent layer flow over the upper edge of the inner side wall into a pocket defined between the outer and inner side walls and the clarified water flows over the upper edge of the outer side wall to the exterior thereof without causing any interfering disturbance between the water layer and the layer of foreign bodies. Thus, the upper edges of the inner and outer walls provide overflow outlet means for the water and foreign bodies. While on the other hand, at least one elongated outlet is formed in the surrounding wall of the tank at a location corresponding to the upper part of the solvent layer for continuously removing the oil contained solvent.

A drain conduit assembly is provided in flow communication with the solvent outlet and comprises upflow and downflow conduits connected together by a plurality of branch conduits at positions above the intended level of the solvent layer. At least two of the branch conduits include ON-OFF valves and they are selectively opened and closed in order to keep the level of the solvent layer in the tank within a predetermined safe range intermediate the solvent outlet and the upper overflow edge of the inner side wall regardless of the change in the specific gravity of the solvent layer in the oil laden upper part thereof due to a varying ratio of the oil dissolved and collected in the uppermost part of the solvent layer. The drain conduit assembly together with the overflow edges of the outer and inner side walls assures a separate, uninterrupted as well as non-interferring discharge of the water, oil containing solvent and other foreign bodies.

Cooling means is provided at least over the lower half of the interior surface of the tank for cooling the solvent layer down to a temperature relatively lower than that of the waste liquid which is being introduced into the tank from its bottom. By keeping the temperature of the solvent layer lower than the introduced waste liquid, the upward movement of the solvent having the dissociated oil therein from the interelectrode space towards the upper surface of the solvent layer is effectively accelerated.

The electrodes used in the tank to produce an electrostatic field include at least a planar electrode surface throughout of which a multiplicity of small electrode tips are planted without difficulties during manufacturing.

BRIEF DESCRIPTION OF THE DRAWINGS

The invention will now be explained in more detail with reference to the accompanying drawings. In the drawings.

PREFFERED EMBODIMENTS OF THE INVENTION

Figure 1:
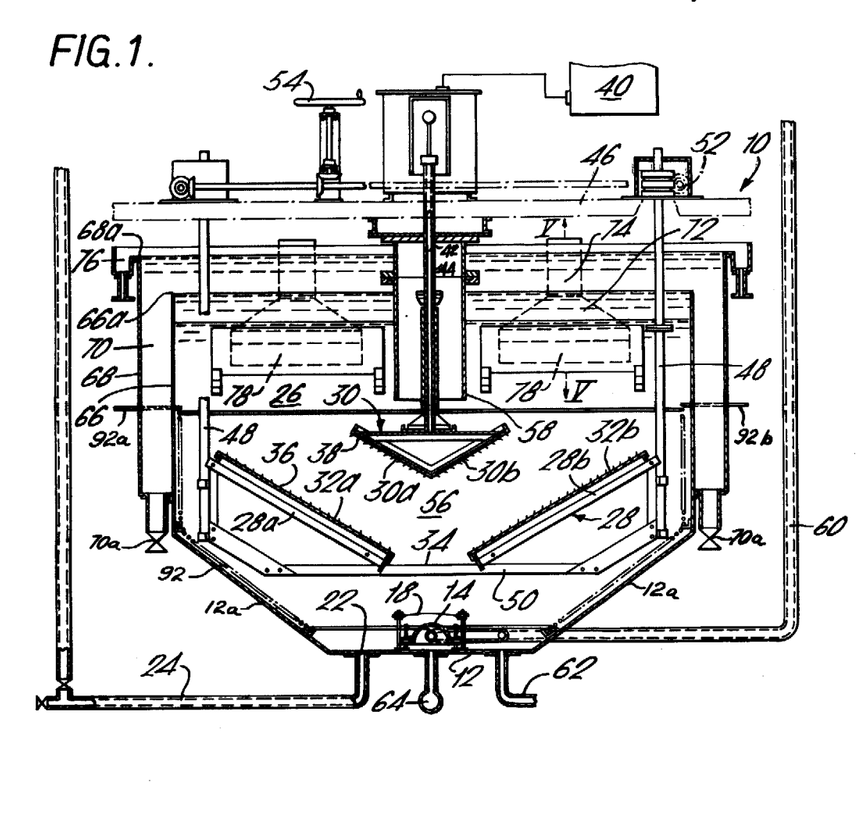
FIG. 1 shows a cross-sectional view of one preferred form of an apparatus according to this invention.
Figure 3:
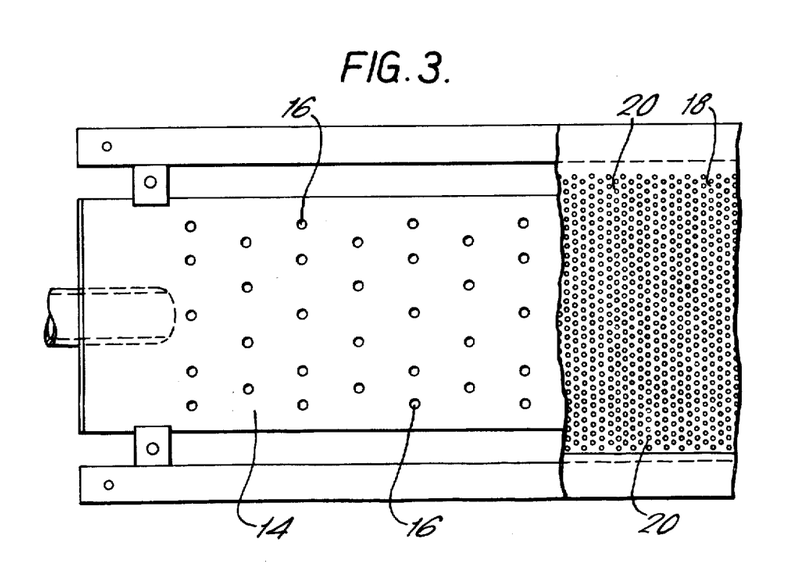
FIG. 3 shows an enlarged, partially cut off, plan view of the inlet means for the waste liquid to be treated and the flow controlling plate in the apparatus shown in FIG. 1.
Figure 4:
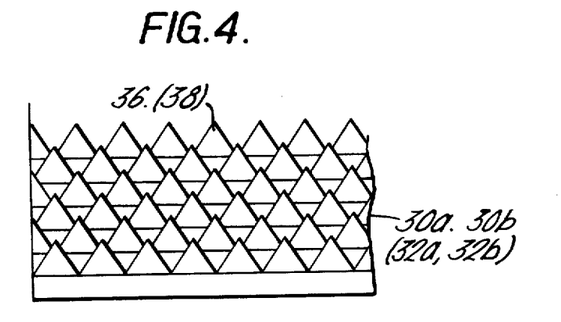
FIG. 4 shows an enlarged view of the planar electrode surface of the electrode in the apparatus of FIG. 1.

Referring now to FIG. 1, there is illustrated a separator tank or tower 10 embodying one preferred form of this invention. At the center of the bottom 12 of the tank 10 is provided inlet means 14 for waste liquids to be treated. In the illustrated embodiment inlet means 14 comprises a semicylindrical member horizontally disposed at an appropriate level above the tank bottom 12 and having a plurality of relatively small holes 16 formed in its cylindrical peripheral wall (FIG. 3). Positioned directly above the semi-cylindrical inlet member 14 is a flow controlling plate 18 of a generally V-shaped cross-sectional configuration with a multiplicity of small pores 20 (see FIG. 3). In the tank bottom, there is also provided a supply port 22 for a separator liquid at a position offset from the semi-cylindrical inlet member 14. The supply port for the separator liquid is communicated via a supply conduit 24 with a source of the separator liquid (now shown). According to this invention, a highly dielectric solvent capable of dissolving oil or oily substances therein and having a specific gravity greater than water is utilized as the suitable separator liquid. For this purpose, organic solvents such as perchloroethylene (tetrachloro ethylene) or trichlene (trichloro ethylene) are preferred. The organic solvent which is introduced into and stored within the separator tank as separator liquid is indicated by the reference numeral 26. Within this solvent layer 26 are positioned a pair of electrodes. The electrodes are anode 28 and cathode 30. The cathode is disposed generally at the center of the tank within the solvent layer 26 and includes a pair of planar electrode surfaces 30a and 30b arranged to form a downwardly protruding V-shaped cross-section as shown in FIG. 1. The anode assembly 28 comprises a pair of anode members 28a and 28b having planar electrode surfaces 32a and 32b, respectively. The anode members 28a and 28b are arranged below the cathode 30 with their planar electrode surfaces 32a and 32b facing parallel to the planar cathode surfaces 30a and 30b. As is apparent from the illustration of FIG. 1, the planar anode surfaces 32a and 32b are spaced from the corresponding cathode surfaces 30a and 30b a distance sufficient to prevent arc discharging between the anode and cathode when potential is applied therebetween. Also as shown in FIG. 1, the anode members 28a and 28b are spaced away from each other so as to form an elongated longitudinal opening 34 therebetween having a width slightly greater than that of the semi-cylindrical inlet member 14. The facing planar electrode surfaces 30a, 30b and 32a, 32b of anode and cathode, respectively, are planted or covered with a multiplicity of small pointed electrode tips 36 and 38, respectively. The pointed electrode tips 36 and 38 are preferably formed in an equilateral triangle, for example having a length of about 1.0cm in each side, and are arranged in tiers as shown in FIG. 4 in a manner hereinafter described. For purposes also hereinafter explained, the electrode tips 36 are planted into the planar cathode surfaces 30a and 30b to extend slightly upwardly and outwardly away from the longitudinal apex of the cathode. Likewise, the electrode tips 38 are also planted into the planar anode surfaces 32a and 32b so as to point slightly upwardly and outwardly away from the longitudinal space 34. In the illustrated embodiment, the cathode constitutes an upper electrode and the anode a lower electrode. However, the cathode may suitably constitute the lower electrode and the anode the upper electrode.

Figure 2:
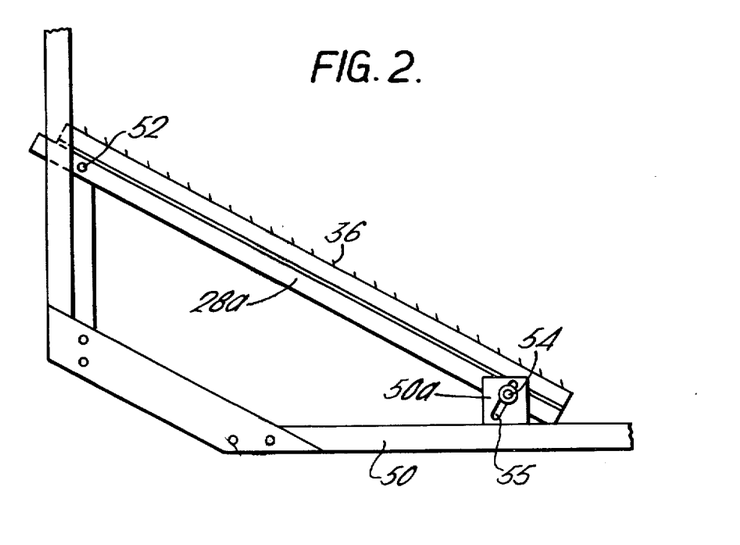
FIG. 2 shows an enlarged view of the lower electrode in the apparatus shown in FIG. 1.

In order to electrically connect the cathode assembly 30 to a high voltage D.C. source 40, there is provided a current carrying cable 42. The current carrying cable 42 comprises an electrically conductive wire covered with an insulating material of water and solvent resistive properties, such as for example, polyethylene. One end of the current carrying cable 42 is connected to the cathode 30, while other end extends upwardly through a protective conduit 44 out of the cover plate 46 and is joined to the D.C. source 40. The protective conduit 44 for the cable also functions to fixedly support the cathode 30 within the solvent layer at a predetermined vertical position with respect to the cover plate 46. While on the other hand, the anode assembly 28, which is grounded, is supported or suspended such that its vertical position with respect to the cathode assembly may be adjustable when needed. For this purpose, as shown in FIGS. 1 and 2, a pair of support rods 48 are connected to a support frame or bracket 50 for the anode assembly and extend upwardly through the tank cover plate 46. At their upper end portions, the support rods 48 are provided with screw gears in meshing engagement with mating adjusting gears 52 on the cover plate. Adjusting gears 52 are adapted to be driven by an operating wheel 54. With this arrangement, the vertical position of the anode assembly 28 with respect to the fixedly supported cathode assembly 30 may readily be adjusted by the manipulation of the wheel 54. The need for adjusting the vertical position of the anode assembly occurs when the interspace 56 between the facing electrode surfaces 30a, 30b and 32a, 32b should be altered as hereinbelow explained. Each of the anode members 28a and 28b is mounted on the support frame 50 such that the angle of inclination of the anode members could be adjusted. As illustrated in FIG. 2, the anode member 28a is pivotally mounted at the upper end to the support frame 50 by means of a mounting pin 52. At the lower end, the anode member 28a is connected to the support frame by a releasable fastening bolt and nut 54 which extends from the side of the anode member through a generally vertically oriented slot 55 in the frame extension 50a. When it is desired to change the inclination of the anode member 28a, the fastening bolt and nut 54 is released, and is moved in either direction along the slot 55 to a desired point which corresponds to the desired inclination of the anode member, after which the fastening bolt and nut is again fixed up to rigidly maintain the anode member in position. FIG. 2 shows fastening means at one side of the anode member 28a. However, in an actual structure, similar fastening means are provided at the opposite side of the anode member. Other anode member 28b is also adjustably mounted to the support frame 50 in substantially the same manner. Thus, the angle of inclination of the anode member could be readily selected within a predetermined range as dictated by the vertical length of the slot 55. This enables a somewhat fine adjustment of the interspace 56 between the anode and the cathode which is a place where an electrostatic field is induced for purposes hereinafter discussed.

A cylinder 58 is provided to surround a substantial portion of the current carrying cable 42 for the purpose of preventing current leakage along the surface of the outer insulation of the cable due to an accumulation of deposited impurities on the outer surface. Thus the cylinder 58 is suitably mounted to the underside of the tank cover plate 46 so as to encompass the substantial portion of the current carrying cable 42 in the tank with a distance therefrom. The cylinder is filled with an inert gas such as air and its lower end extends into the solvent layer 26 within the tank. A feed pipe 60 for the waste liquid to be separated connects a waste liquid reservoir (not shown) to the semi-cylindrical inlet member 14. In order to introduce the waste liquid under an appropriate pressure into the separator tank, the waste liquid reservoir may be installed at an elevated position with respect to the bottom 12 of the tank. A drain pipe 62 is also connected to the tank bottom 12 for removing solid impurities which are precipitated out of the waste liquid and deposited on the tank bottom. When cleaning the separator tank, liquids within the tank including cleaning liquids are drained out through a discharge conduit 64 joined to the tank bottom.

According to one aspect of this invention, the side walls of the separator tank 1 have a double layer design. As shown in FIG. 1, the side wall structure comprises an inner side wall 66 and an outer side wall 68 spaced a distance away from each other to form a vertically extending space or pocket 70 therebetween. As hereinafter explained in detail, the waste liquid introduced into the tank from its bottom is separated generally into water, oil and floatable foreign bodies under the dissolving action of the solvent primarily in the interelectrode space 56. While the dissociated oil is dissolved into the solvent layer 26, the separated water and floatable foreign bodies respectively form a substantially discrete layer. According to their specific gravities, foreign bodies form a substantially discrete layer 72 directly above the oil containing solvent layer 26 and the separated water forms another discrete layer 74 above the layer of foreign bodies. With the above kept in mind, the inner side wall 66 of the separator tank is designed such that its upper edge 66a may extend a distance above a preselected level of the solvent layer 26 and that foreign bodies forming a discrete layer 72 above the solvent layer may flow over this upper edge 66a down into the pocket 70 between the inner and outer side walls 66 and 68. As the amount of foreign bodies within the pocket 70 reaches a predetermined level, a drain outlet 70a at the bottom of the pocket is opened to remove them from the pocket. Thus, the layer 72 of floatable foreign bodies is kept at substantially a fixed level which corresponds to the level of the upper edge 66a. On the other hand, the outer side wall 68 of the separator tank is designed such that its upper edge 68a extends a distance above the layer of foreign bodies 72 and that the separated water forming a discrete clarified water layer 74 above the layer 72 of foreign bodies may flow over this upper edge 68a. Along the upper edge 68a of the outer side wall 68 on the outside thereof, there is provided a water trough 76 for receiving and dispensing the overflowing clarified water. Thus, the upper edges 66a and 68a provide overflow outlet means for the separated water and foreign bodies.

Figure 5:
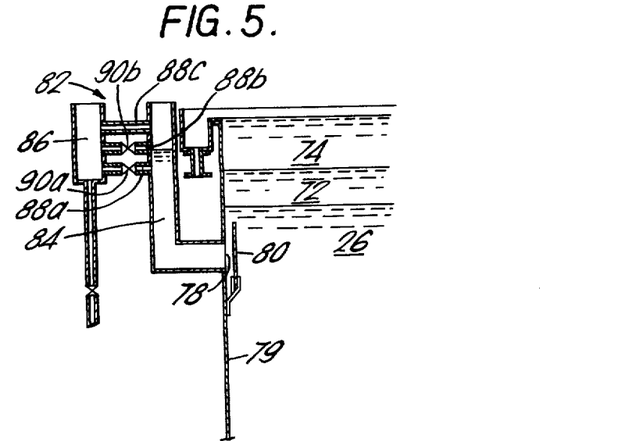
FIG. 5 shows a sectional view taken along the line V—V in FIG. 1.

According to another aspect of the invention, one or more outlets for the oil dissolved solvent are formed in the front wall and/or the rear wall of the separator tank. In the illustrated embodiment, (FIG. 5) two such outlets in the form of an elongated opening are made in the rear wall 79 of the tank. Although the rear wall 79 is illustrated as having a single wall structure, it could be designed to have a double-wall structure as in the side walls. The same is true with the front wall (not shown). Also the elongated solvent outlets 78 and the associated drain conduit assembly hereinbelow explained may well be formed in the double-wall side walls of the tank. As shown more particularly in FIG. 5, a vertical baffle plate 80 is mounted inside the single-layer rear wall 79 in spaced-away, parallel facing relation with the solvent outlets 78. The baffle plate 80 functions to prevent water and other foreign bodies dissociated from oil in the waste liquid and moving upwardly within the solvent layer from being discharged out of the elongated solvent outlets 78 together with the oil containing solvent. A pair of drain conduit assemblies 82 are attached to the outside of the rear wall 79 in flow communication with the solvent outlets 78. As shown in FIG. 5, the drain conduit assembly 82 includes an upflow conduit 84 and a downflow conduit 86 which are connected together by a plurality of branch conduits 88a, 88b and 88c. The upflow conduit 84 is in direct flow communication with the solvent outlet 78 and extends upwardly above the predetermined level of the solvent layer 26. The branch conduits 88a, 88 b and 88c connect the upflow and downflow conduits in flow communication relation with each other at three different levels above the level of the solvent layer for purposes hereinafter explained. Of the three branch conduits, the lower and intermediate branch conduits 88a and 88b include ON-OFF valves 90a and 90b, respectively.

According to another aspect of this invention, a cooling pipe 92 is spirally arranged inside the separator tank along the lower half of the inner side wall 66 and sloped bottom wall sections 12a. The cooling pipe 92 includes an inlet 92a and an outlet 92b for the cooling medium such as water which is circulated therethrough from a refrigerator (not shown). The purpose of providing the spirally arranged cooling pipe 92 is to cool down the portion of the solvent within the tank in contact with and adjacent to the cooling pipe.

FIG. 3 illustrates in detail the plan configuration of the semi-cylindrical inlet member 14 and the associated flow controlling plate 18 disposed above the inlet member. As shown, the inlet member 14 has a plurality of relatively small holes 16 formed throughout its peripheral wall. The flow controlling plate 18 also has a plurality of small pores 20 formed therein although their size is smaller and their number is greater than that of the holes 16 in the inlet member. With this arrangement, the waste liquid to be treated, as it is being introduced into the tank through the feed pipe 60, flows upwardly first through the holes 16 in the inlet member, then through the pores 20 in the flow controlling plate and finally issues out of the flow controlling plate 18 in the form of a multiplicity of droplets. Thus, the waste liquid is introduced into the tank neither in the form of jets nor in the form of a stream.

FIG. 4 illustrates in detail the arrangement of pointed electrode tips over the planar electrode surfaces of the cathode and anode. As shown, electrode surfaces 30a, 30b and 32a and 32b are densely planted or covered with a multiplicity of electrode tips 36 and 38, each having the shape of an equilateral triangle. The triangular electrode tips 36 and 38 are arranged in a plurality of tiers with the electrode tips in one tier being staggered from the electrode tips in adjacent tiers in an alternate fashion. As hereinabove explained in connection with FIG. 1, the electrode tips in each electrode point towards the opposite electrode in a direction slightly away from the longitudinal axis of the electrode. It is also preferred to plant the electrode tips over the respective electrode surfaces such that the distance between the pointed ends of the anode electrode tips and the cathode electrode tips may be substantially equal.

The operation of the separator tank is now described in connection with separating oil and foreign bodies from water in a liquid factory waste.

An electrically insulating or dielectric solvent capable of dissolving oil and having a specific gravity grater than that of water, for example, perchloroethylene is introduced through the supply port 22 to fill the tank with the solvent up to a predetermined level. Perchloroethylene has a specific gravity of 1.62 at temperatures between 20°24°C; solubilites of 0.015% solvent in water at 25°C and 0.01% water in solvent at 25°C; a dielectric constant of 2.365 at 25°C; a specific resistance of $1.8 \times 10^{13}$ ohm/cm; a freezing point of −22.4°C; and a viscosity of 0.88 centipoise at 20°C. It is also extremely stable even in contact with water.

After filling the tank with the desired amount of the dielectric solvent, a high voltage D.C. potential is applied between the anode 28 and the cathode 30 to produce an electrostatic field in the interelectrode space 56 within the solvent layer 26. Of course, the desired D.C. potential across the electrodes depends on such factors as the distance between the electrodes, the dielectric solvent to be used and the nature of the waste liquid to be treated. In case perchloroethylene is employed as the solvent, and the interelectrode distance is set at approximately 10 cm, a D.C. potential as great as 50 kV could be safely applied between the electrodes 28 and 30.

As a preparatory measure prior to supplying the oil containing liquid factory waste into the separator tank of the invention, it is preferred to mix the waste liquid with the same solvent as employed in the tank in an appropriate ratio thereby to preadjust the specific gravity of the obtained mixture at a value between the specific gravities of water and the solvent in the tank. The mixture of the solvent and the oil containing waste liquid is fed under pressure through the feed pipe 60, the semi-cylindrical inlet member 14 and the flow controlling plate 18 into the solvent layer 26 within the tank. As hereinabove described, the mixture i.e., the solvent containing waste liquid issues out of the flow controlling plate 18 in a multiplicity of droplets. Droplets of the waste liquid thus formed move within the solvent layer upwardly through the longitudinal opening 34 towards the apex of the cathode 30 due to the fact that the waste liquid has a smaller specific gravity than the solvent employed. It should be noted at this point that the cathode 30 is spaced from the inlet member 14 a distance sufficient to prevent any dielectric breakdown therebetween. The fact that the waste liquid is introduced into the tank in the form of droplets is also effective to prevent a dielectric breakdown between the cathode and the inlet member which otherwise would occur due to the presence of the waste liquid therebetween. The rising droplets of the waste liquid accumulate themselves in the form of a layer or film along the apex of the V-shaped cathode 30. However, the film of the waste liquid tends to spread upwardly along the sloped planar cathode surfaces 30a and 30b due also to its smaller specific gravity as compared to that of the solvent layer 26. As the film of the waste liquid spreads out, it moves along the multiplicity of electrode tips 36 and is again separated into small droplets which finally reach to the pointed ends of the electrode tips. The waste liquid droplets on the cathode electrode tips 36 are naturally electrified to a negative charge. Since a high D.C. potential is applied between the anode and the cathode to form an electrostatic field therebetween within the solvent layer, the negatively charged liquid droplets migrate at high speed toward the facing anode electrode surfaces 32a and 32b through the interelectrode space 56 under the well-known electrophoretic effect. The liquid droplets at the anode electrode surfaces are guided upwardly towards the pointed ends of the electrode tips 38 in substantially the same manner as at the cathode electrode surfaces while being electrified to a positive charge. The positively charged liquid droplets then migrate at high speed in an opposite direction towards the facing cathode electrode surfaces 30a and 30b through the electrostatic interelectrode space under the electrophoretic effect. In this manner, the liquid droplets shuttle back and forth at high speed within the electrostatic field between the anode and the cathode and, as they shuttle back and forth, they move from the longitudinal center of the interelectrode space 56 upwardly and outwardly towards the outer edges thereof. Also, as the droplets shuttle back and forth at high speed within the solvent filled electrostatic field from its longitudinal center towards its outer edges, the droplets are separated into progressively smaller particles until the oil and foreign bodies therein are dissociated from the water. The dissociated oil is then substantially dissolved into the solvent within the interelectrode space 56, while the separated water and foreign bodies rise slowly within the solvent layer 26 to form substantially discrete layers respectively above the solvent layer. In accordance with the difference in their specific gravities, the foreign bodies form a layer 72 directly above the solvent layer 26, while the clarified water forms a substantially discrete layer 74 above the layer 72 of foreign bodies as shown in FIG. 1. It is noted that, since the solvent filled interelectrode space 56 has a relatively greater lateral extension, the liquid droplets are subject to the electrophoretic migration for an extended period of time. This assures a complete and effective dissociation of the oil and foreign bodies from the water as well as a complete dissolving of the dissociated oil into the solvent layer. Perchloroethylene, having a specific gravity greater than that of water, naturally exceeds the dissociated oil in terms of the specific gravity. Thus, the portion of the solvent having the oil dissolved therein within the interelectrode space 56 exhibits a specific gravity relatively smaller than that of the rest of the fresh solvent outside the interelectrode space. This portion of the oil dissolved solvent flows upwardly along the interelectrode space towards the upper surface of the solvent layer 26.

Incidentally, with the spiral cooling pipe 92 being supplied with circulating cooling water, the solvent layer 26 is cooled down at its peripheral portion in contact with and adjacent to the cooling pipe, thus bringing the temperature of the solvent layer relatively lower than that of the waste liquid which is being introduced from the tank bottom into the solvent layer. While on the other hand, as the introduced waste liquid flows in the form of droplets upwardly through the elongated opening 34 into the interelectrode space 56, the heat of the waste liquid is absorbed by the solvent which comes in contact with the droplets of the waste liquid. In other words, the portions of the solvent above the inlet member 14 and within the interelectrode space 56 are warmed up to higher temperatures with respect to the surrounding portion of the solvent layer adjacent the cooling pipe 92. This temperature difference within the solvent layer also facilitates a speedy upward movement of the oil dissolved solvent within the interelectrode space towards the upper surface of the solvent layer. As the solvent having the oil dissolved therein collects in the upper part of the solvent layer 26, the ratio of the dissolved oil in the upper part of the solvent layer progressively increases. The oil laden solvent then flows through the elongated outlets 78 (FIG.

3) in the rear wall into the upflow conduits 84 of the drain conduit assemblies 82.

The solvent outlets and the outlet conduit assemblies are provided in order to keep the upper surface of the solvent layer 26 at substantially a fixed level regardless of the inflow of the waste liquid into the tank. Thus, the upflow conduits 84 are designed to extend upwardly above the intented level of the solvent layer. Also, the connecting conduits 88a, 88b and 88c are provided at different vertical positions above the level of the solvent layer. With this arrangement, for example, if the ON-OFF valves 90b in the intermediate branch conduits 88b are opened and the ON-OFF valves 90a in the lower branch conduits 88a are closed, the oil containing solvent entering the upflow conduits 84 through the elongated solvent outlets 78 rises to the level of the intermediate branch conduits 88c and flows therethrough into the downflow conduits 86 to be finally discharged outside. Thus, the upper surface of the oil laden solvent within the upflow conduits 84 is kept substantially at the level of the intermediate branch conduits 88b. It should be noted at this point that, since a downward pressure is acted on the solvent layer 26 by the presence of the layer of foreign bodies 72 and the clarified water layer 74, the upper surface of the solvent layer within the tank always stays at a level relatively lower than the liquid level within the upflow conduits 84. The level of the solvent layer under this condition should be regarded as a reference level. However, with the progress of the separating action on the droplets of the waste liquid within the interelectrode space 56, the oil dissociated from the water and dissolved in the solvent progressively collects in the uppermost portion of the solvent layer as hereinabove discussed. The solvent adjacent the upper surface of the solvent layer heavily laden with the dissociated oil naturally flows into the upflow conduits 84 resulting in a reduction of the specific gravity of the oil containing solvent within the upflow conduits. As can be readily understood by those skilled in the art, any reduction in the specific gravity of the oil containing solvent within the upflow conduits breaks the prevailing pressure equilibrium between the solvent layer 26 and the layers 72 and 74 thereabove, which in turn tends to lower the level of the solvent layer although the liquid level within the upflow conduits remains unchanged at the level of intermediate conduits 88b. An excess downfall of the liquid level of the solvent layer 26 within the tank is undesirable in that it develops the possibilities of foreign bodies above the solvent layer entering the upflow conduits 84 through the solvent outlets 78 as the result of the corresponding fall of the layer 72 when it is intended and is of utmost importance to discriminately discharge the water, foreign bodies and the dissociated oil through separate outlets. In order to effectively avoid this undesired situation to take place, it is merely necessary to shut off the valves 90a in the lowermost branch conduits 88a. Closing of the lowermost ON-OFF valves 90a, with the valves 90b being kept in its closed position, the liquid level within the upflow conduits 84 is allowed to go up to the level of the uppermost branch conduits 88c. This rise in the liquid level within the upflow conduits accompanies a corresponding rise in the level of the solvent layer 26 within the tank. Thus, the above mentioned falling tendency of the solvent layer is effectively offset and a detrimental downfall thereof is avoided thereby to keep the layer 72 of foreign bodies well above the solvent outlet 78.

On the other hand, for the intended discriminate discharging of the clarified water, foreign bodies and the oil dissolved solvent, the level of the solvent layer 26 should not rise to the level of the uppermost edge 66a of the inner side wall 66. According to this invention, both of the valves 90a and 90b in the branch conduits 88a and 88b are kept open in order to avoid such an excess rise in the level of the solvent layer. The closing of the valves 90a and 90b permits the oil laden liquid within the upflow conduits to flow through the brnach conduits 88a and 88b out into the downflow conduits 86 for the final discharge outside. Then the liquid level within the upflow conduits 84 goes down to the point of the lowermost branch conduits 88a bringing a corresponding fall of the solvent layer 26 within the tank. Any possibilities of the solvent in the separator tank to flow over the upper edge 66a of the inner side wall into the pocket 70 for foreign bodies are thus avoided assuring the intended discriminate discharge.

What I claim is:

1. An electrostatic separating apparatus for separating oil, floatable foreign bodies and water from waste liquid, comprising:

a separator tank adapted to contain a liquid dielectric solvent,
being capable of dissolving oil, having a specific gravity greater than that of water and capable of defining a substantially distinct level at its upper surface;
inlet means in said separator tank at its bottom adapted to introduce said waste liquid into said separator tank as a multiplicity of droplets;
a pair of electrodes in said separator tank, positionable to be within said solvent and defining an interelectrode space, said electrodes connectable to a substantially high voltage D.C. potential in order to produce an electrostatic field in said interelectrode space such that when waste liquid is introduced through said inlet means, said waste liquid is separated into oil, floatable foreign bodies and water due to an electrophoretic effect of said electrostatic field, said oil being substantially dissolved in said solvent near said upper surface thereof, said floatable foreign bodies forming a substantially distinct layer above the level of said solvent and said water forming a substantially distinct layer aobve the layer of floatable foreign bodies;
first outlet means positionable on said separator tank slightly below the upper surface of said solvent for discharging oil-containing solvent;
second outlet means disposed above the upper surface of said solvent for discharging floatable foreign bodies separated from said waste liquid in said separator tank;
third outlet means disposed above the level of said floatable foreign bodies for discharging water separated from said waste liquid in said separator tank; and
a drain conduit assembly in communication with said first outlet means, said drain assembly comprising:
an upflow conduit in direct flow communication with said first outlet means,
a downflow conduit, a plurality of intermediate branch conduits positionable above the upper surface of the solvent and connecting said upflow conduit and said downflow conduit in flow communication with each other at different levels above the upper surface of said solvent, and ON-OFF valves in said branch conduits for selectively opening and closing said branch conduits in order to maintain the upper surface of said solvent at a substantially fixed level regardless of inflow of waste liquid into the tank, such that said floatable foreign bodies are discharged through said second outlet means, said water is discharged through said third outlet means and said oil-containing solvent near the upper surface of said solvent is discharged through said first outlet means in flow communication with said drain conduit assembly.

2. An electrostatic separating apparatus according to claim 1, having three intermediate branch conduits positioned low, intermediate and high with respect to each other between said upflow and downflow conduits, said low and intermediate conduits having ON-OFF valves, and, further comprising a baffle plate mounted in said separator tank on its inside wall below said first outlet means, said baffle plate mounted in spaced-away parallel facing relation with said first outlet means and extending above said first outlet means to prevent water and foreign bodies from being drawn into said first outlet means.

3. An electrostatic separating apparatus according to claim 2, wherein said inlet means is formed with a peripheral wall adjacent said solvent, said peripheral wall having a plurality of substantially small holes formed therein, and, which further comprises a flow controlling plate disposed above and in substantially close proximity to said peripheral wall, said flow controlling plate being formed with a plurality of pores smaller than the holes in said peripheral wall.

4. An electrostatic separating apparatus according to claim 1 wherein said second and third outlet means are formed by said separator tank which further comprises:
an inner wall, an outer wall and a vertically extending pocket defined between said inner and outer walls, said outer wall having an upper edge extending a distance above that of said inner wall such that the upper edge of said inner wall extends above the upper surface of said solvent to enable floatable foreign bodies above said solvent to flow over the upper edge of said inner wall into said vertically extending pocket, and, the upper edge of said outer wall extending above the layer of floatable foreign bodies to enable separated water to flow over said upper edge of said outer wall;
a trough formed on said outer wall along its outside near the upper edge of said outer wall to collect separated water which flows over said upper edge for discharging said separated water; and
at least one drain valve in said vertically extending pocket substantially near its bottom, said foreign bodies being removed from said pocket when said drain valve is opened as accumulation of said floatable bodies reaches a predetermined level.

* * * * *